United States Patent [19]
Ryu

[11] Patent Number: 5,346,302
[45] Date of Patent: Sep. 13, 1994

[54] APPARATUS FOR MIXING LIQUIDS IN A CERTAIN RATIO

[75] Inventor: Do H. Ryu, Kyungsangnam-Do, Rep. of Korea

[73] Assignee: Goldstar Electron Co., Ltd., Choongchungbook-Do, Rep. of Korea

[21] Appl. No.: 795,450

[22] Filed: Nov. 21, 1991

[30] Foreign Application Priority Data

May 15, 1991 [KR] Rep. of Korea ............... 7867/1991

[51] Int. Cl.$^5$ ...................... B01F 13/02; B01F 15/04
[52] U.S. Cl. ...................... 366/101; 222/56; 222/64
[58] Field of Search ............ 366/101, 102, 106, 107, 366/141, 151, 152, 153, 154, 160, 162; 222/56, 64; 422/106, 107

[56] References Cited

U.S. PATENT DOCUMENTS

| | | | |
|---|---|---|---|
| 3,843,099 | 10/1974 | Duncan | 366/153 |
| 4,014,527 | 3/1977 | Watson | 366/101 |
| 4,845,965 | 7/1989 | Copeland | 222/64 |
| 4,878,758 | 11/1989 | Schafer | 366/101 |

Primary Examiner—Robert W. Jenkins
Attorney, Agent, or Firm—Lowe, Price, LeBlanc & Becker

[57] ABSTRACT

An apparatus for mixing a deionized water and a hydrofluoric acid precisely in the ratio of 100:1, so as to produce a mixture which are properly used in etching wafters. The mixing apparatus comprises a self-lubricating plastic container of a double construction which enables to obtain a more precise quantity of liquid. The mixing apparatus also comprises an electronic balance measuring the weight of the liquid mixture, an indicator indicating numerically the weight measured by the balance, a mixing tank mixing the liquids, and control valves supplying the liquids in large and small quantities, respectively. According to this arrangement, it is possible to obtain a mixture of a large quantity liquid or a small quantity liquid in a precise mixing ratio with a tolerance of within 1%. Thereby, any poor etching of wafers can be avoided.

10 Claims, 4 Drawing Sheets

APPARATUS FOR MIXING LIQUIDS IN A CERTAIN RATIO

BACKGROUND OF THE INVENTION

The present invention relates to an apparatus for mixing liquids in a certain ratio, and more particularly to an apparatus, for exampie, for mixing a deionized water and a hydrofluoric acid precisely in the ratio of 100:1, so as to produce mixtures which are properly used in etching wafers.

General)y, in order to prevent poor wafer etching in manufacturing semiconductor products, deionized water and hydrofluoric acid should be mixed in a predetermined ratio, for exampie, precisely in the ratio of 100:1. Referring to FIG. 1, there is shown an example of a conventional mixing apparatus. In the mixing apparatus, predetermined amount of deionized water and hydrofluoric acid are introduced in a buffer tank 33 through liquid f)ow meters 31 and respective)y, so that the aleionized water and the hydrofluoric acid are mixed in the ratio of 100:1 therein. Then, the resulting mixture pumped into a chemical bath 35 by means of a chemical pump 34.

In the convent)oral mixing apparatus, however, the volumes of the deionized water and the hydrofluoric acid are not precisely measured, so that the mixture ratio deviates from a desired ratio by about 2%. As a result, the etching of wafers is deteriorated.

SUMMARY OF THE INVENTION

Therefore, an object of the invention is to overcome the abovementioned disadvantages encountered in the prior art and to provide an apparatus for mixing liquids which is capable of producing a mixture having a precise mixing ratio.

In one aspect, the present invention provides a liquid dispenser comprising: liquid level sensing means for sensing levels of a liquid supplied in a self-lubricating plastic container; liquid dispensing means for dispensing the liquid from said self-lubricating plastic container to a chemical container in a quantity corresponding to the capacity of the self-lubricating plastic container; and automatic liquid supply means for automatically supplying the liquid from a chemical tank to the self-lubricating plastic container.

In another aspect, the present invention provides an apparatus for mixing one and the other liquids in a predetermined mixing ratio, comprising: a liquid dispenser including liquid level sensing means for sensing levels of a liquid supplied in a self-lubricating plastic container, liquid dispensing means for dispensing the liquid from said self-lubricating plastic container to a chemical container in a quantity corresponding to the capacity of the self-lubricating plastic container, and automatic liquid supply means for automatically supplying the liquid from a chemical tank to the self-lubricating plastic container; mixing means for mixing precisely the liquids in the precise predetermined mixing ratio; liquid mixture draining means for feeding the liquid mixture to a storage tank; and control means for controlling overall operations.

BRIEF DESCRIPTION OF THE DRAWINGS

Other object and aspects of the invention will become apparent from the following description of embodiments with reference to the accompanying drawings in which.

DETAILED DESCRIPTION OF THE PREFERRED EMBODIMENTS

Figure 1:
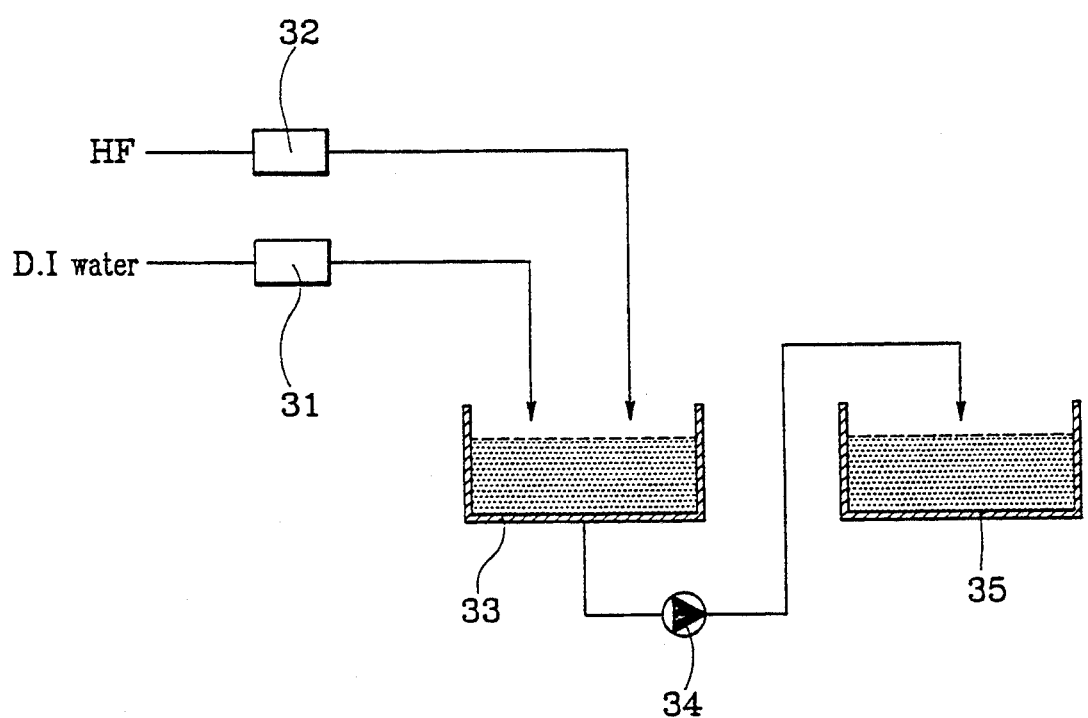
FIG. 1 is a schematic view of a conventional mixing apparatus.
Figure 2:
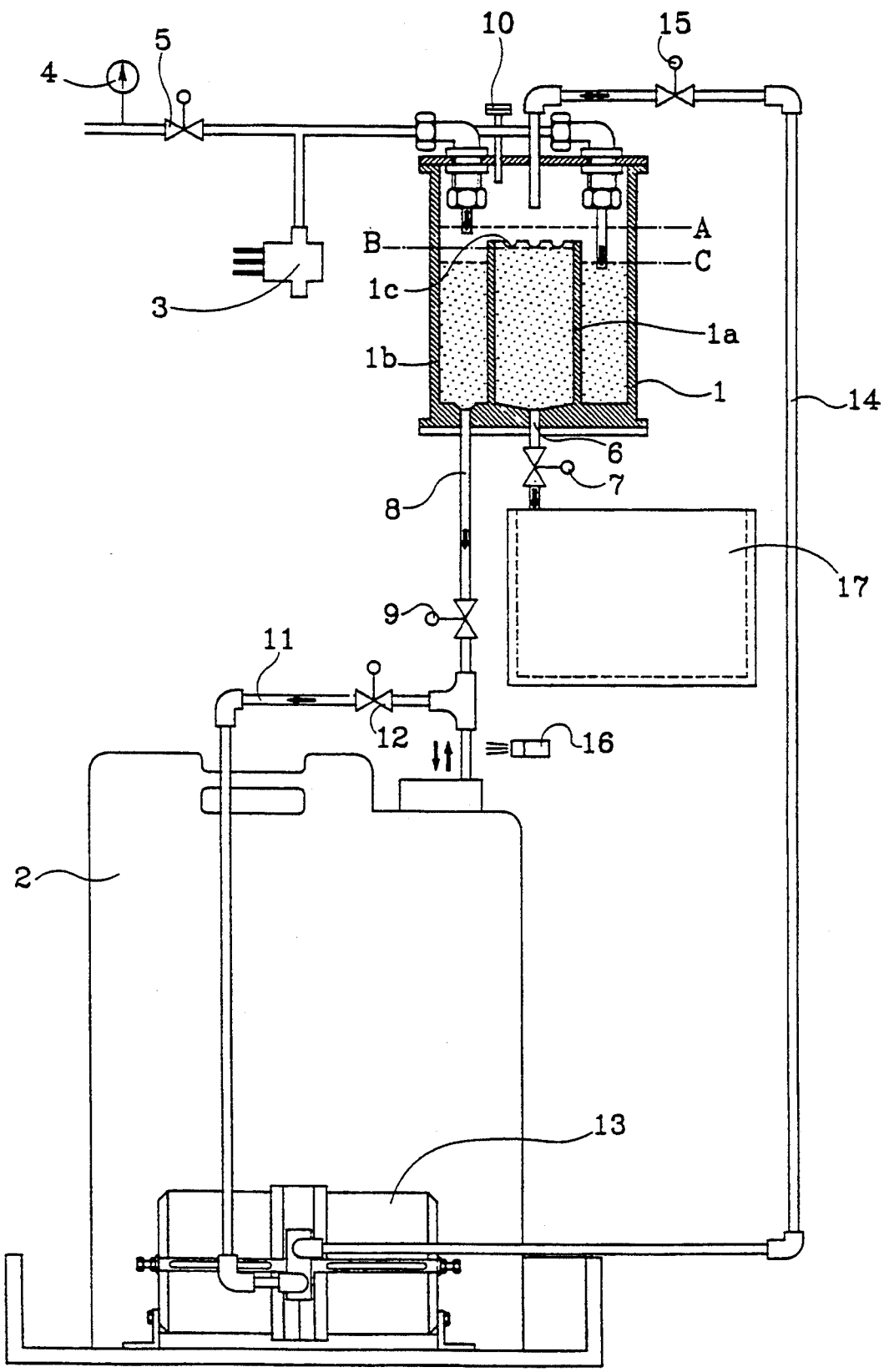
FIG. 2 is a front view of a liquid dispenser in accordance with the present invention.
Figure 3:
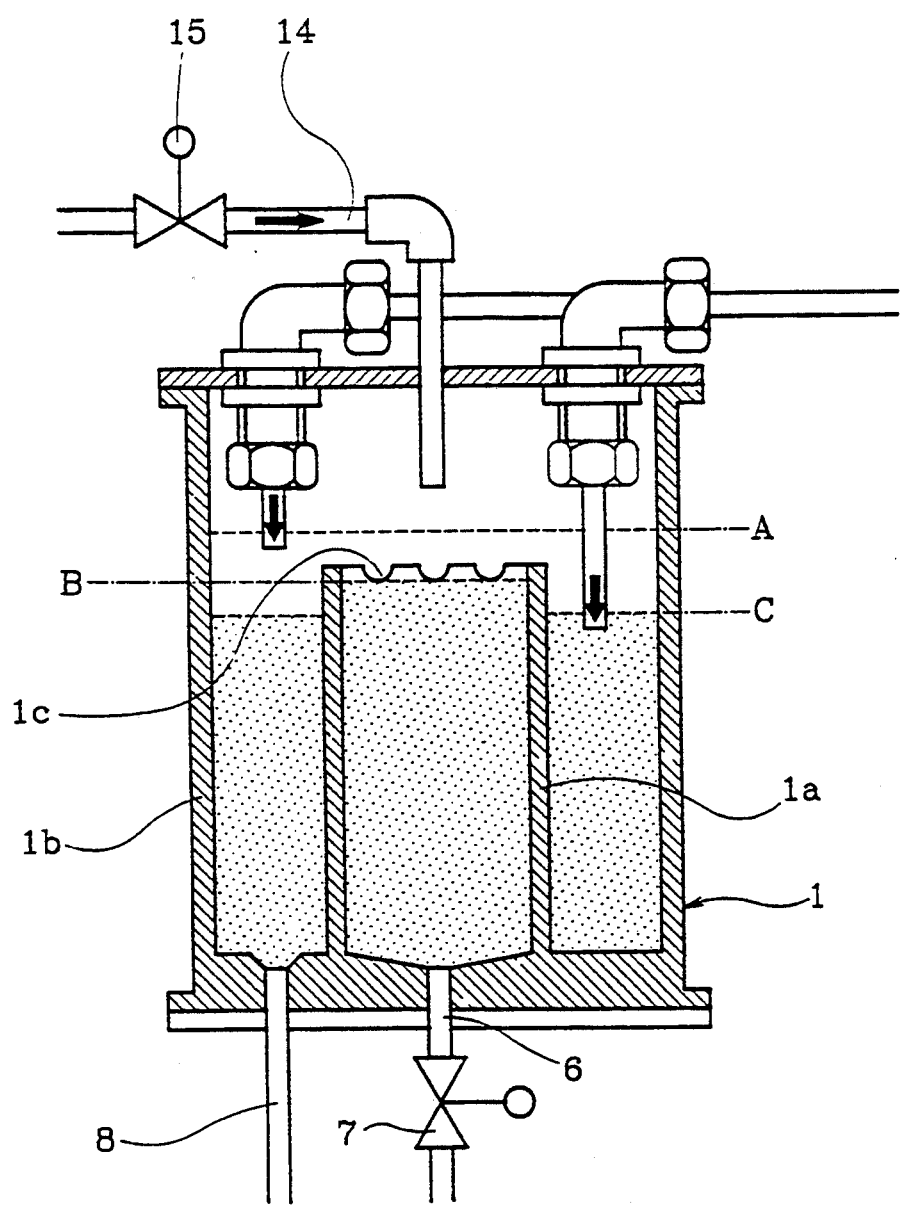
FIG. 3 is a fragmental sectional view of the liquid dispenser shown in FIG. 2.

Referring to FIG. 2, there is shown a liquid dispenser which is applied to an apparatus for mixing liquids in a predetermined ratio, in accordance with the present invention. The liquid dispenser comprises a liquid level sensing unit for sensing levels A, B and C of a liquid supplied in a self-lubricating plastic container 1 (said self-lubricating plastic is sold under the trademark TEFLON), a liquid dispensing unit for dispensing the liquid from the self-lubricating plastic container to a chemical bath 17 in an amount corresponding to the capacity of the self-lubricating plastic container, and an automatic liquid supply unit for automatically supplying the liquid from the chemical tank 2 to the self-lubricating plastic container 1.

The liquid level sensing unit includes an air diaphragm sensor 3 adapted to sense the level of a liquid in the self-lubricating plastic container 1, an air regulator 4 aaapted to regulate the pressure of N2, diatomic nitrogen gas, such that it meets the specification of the air diaphragm sensor 3, and a needle valve 5 adapted to regulate the flow rate of N2.

The liquid dispensing unit includes a double self-lubricating plastic having a dispensing container 1a and an outer container 1b, a self-lubricating plastic conduit 6 and an automatic valve 7 which are adapted to drain a predetermined quantity of the liquid from the dispensing container 1a, a self-lubricating plastic conduit 8 and an automatic valve 9 which are adapted to drain the liquid from the outer container 1b to the chemical tank 2, and an air filter (air port) 10.

On the other hand, the automatic liquid supply unit includes the chemical tank 2 containing the liquid to be supplied to the liquid dispensing unit, a self-lubricating plastic conduit 11 connected to the self-lubricating plastic conduit 8 of the liquid dispensing unit and an automatic valve 12 disposed in the self-lubricating plastic conduit 11, a bellows pump 13 adapted to pump the liquid from the chemical tank 2 to the self-lubricating plastic container 1, a teflon conduit 14 and an automatic valve 15 which are adapted to transport the liquid from the chemical tank 2 to the self-lubricating plastic container 1, and an empty sensor 16 adapted to sense the presence or absence of liquid in the chemical tank 2.

Now, operation of the liquid dispenser according to the present invention will be described.

In order to sense the level of liquid, the air regulator 4 of the liquid level sensing unit which is connected with a self-lubricating plastic tube of the self-lubricating plastic container 1 is first adjusted such that the differential pressure across the air regulator 4 is 20 psi. Also, the N2 flow rate at the needle valve 5 is adjusted to be 2 to 3 bubbles/sec. It is also checked that respective automatic valves 7, 9, 12 and 15 are maintained at their OFF states.

Then, the dispenser is powered on so as to check whether the sensor 16 of chemical tank 2 is in the OFF state. The on state of the sensor 16 indiates that, there is no liquid in the chemical tank 2.

Under the above-mentioned condition, automatic valves 12 and 15 of the automatic liquid supply unit are opened. The bellows pump 13 operates to supply the liquid from the chemical tank 2 to the self-lubricating plastic container 1 via the self-lubricating plastic conduit 14 so that the liquid is maintained at the level A of the self-lubricating plastic container 1.

As the air diaphragm 3 senses that the liquid is supplied to the level A of the self-lubricating plastic container 1, it generates an electric signal which closes automatic valves 12 and 15, and stops bellows pump 13.

Thereafter, the automatic valve 9 of the liquid dispensing unit is opened so that the liquid in the outer container 1b is drained to the level C. As a result, the liquid in the dispensing container 1a is at the level B which corresponds precisely to the capacity of the dispensing container 1a.

At the upper peripheral edge of the liquid dispensing container 1a is located a plurality of spaced recesses 1c, which prevents any possible surface tension at the upper peripheral edge of the container 1a, allowing for a more precise amount of the liquid to be contained in the dispensing container 1a.

When a predetermined amount of liquid is contained in the dispensing container 1a, the automatic valve 7 of the dispensing unit is opened to supply the liquid from the dispensing container 1a to the chemical container 17. Thus, a more precise amount of liquid is supplied to the chemical container 17.

Figure 4:
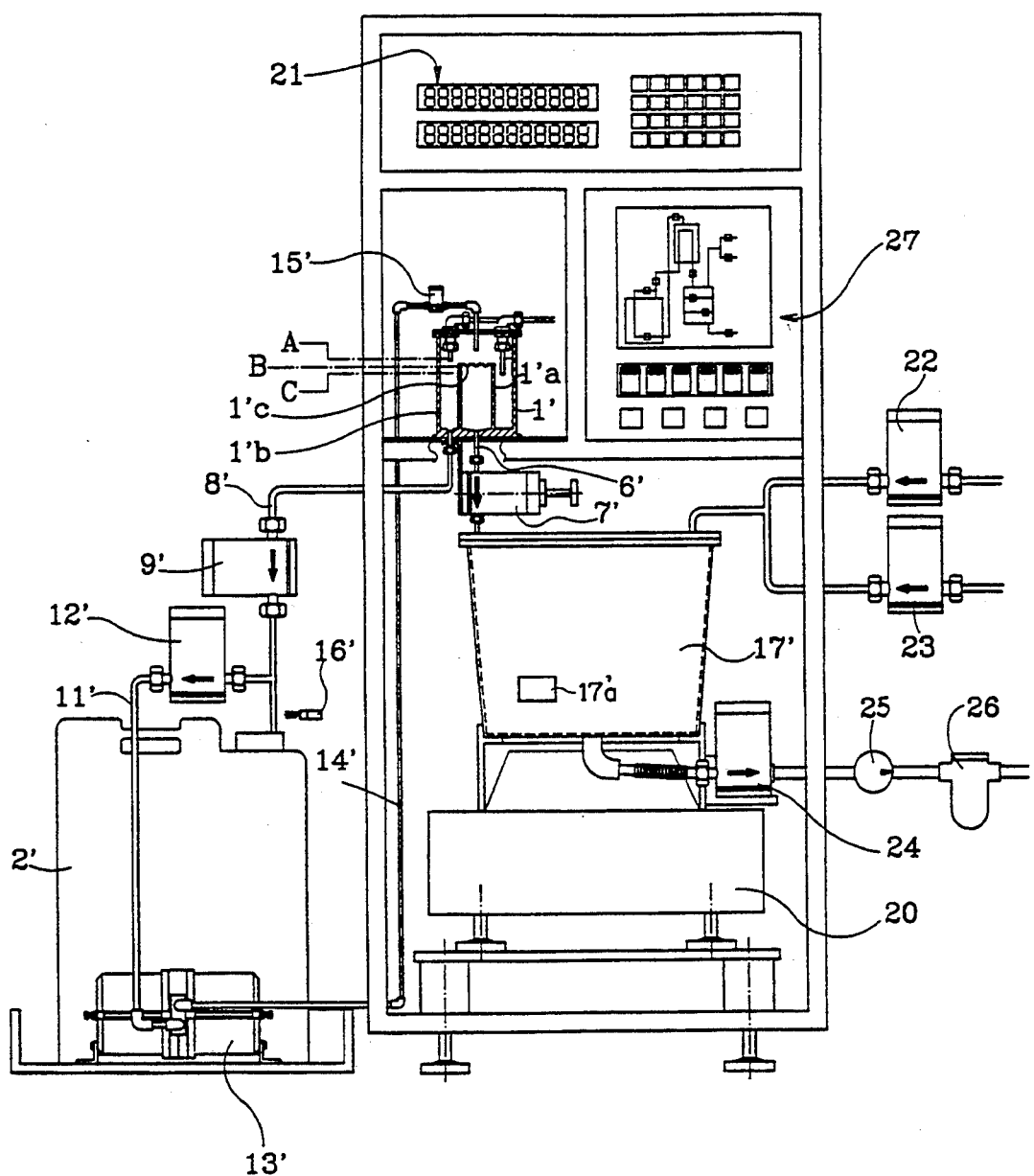
FIG. 4 is a front view of a mixing apparatus in accordance with the present invention.

On the other hand, FIG. 4 shows an apparatus for mixing liquids in a certain ratio, which utilizes the above-mentioned liquid dispenser. The mixing apparatus of the present invention will now be described in conjunction with the case that a deionized water and a hydrofluoric acid are mixed in the ratio of 100:1.

The mixing apparatus of the present invention includes the arrangement of the above-mentioned liquid dispenser shown in FIG. 2, without any alteration.

That is, the mixing apparatus comprises a hydrofluoric acid level sensing unit for sensing levels A, B and C of the hydrofluoric acid supplied in a self-lubricating plastic container 1', a hydrofluoric acid dispensing unit for dispensing the hydrofluoric acid from the self-lubricating plastic container 1' to a mixing tank 17' in an amount corresponding to 100 cc, and an automatic hydrofluoric acid supply unit for automatically supplying the hydrofluoric acid from a hydrofluoric acid tank 2' having the capacity of 5 gallons to the self-lubricating plastic container 1'. The mixing apparatus also comprises a mixing unit for mixing precisely the deionized water and the hydrofluoric acid in the ratio of 100:1, a mixed liquid draining unit for feeding the mixed liquid to a storage tank, and a control unit for controlling the operation of mixing apparatus.

The hydrofluoric acid level sensing unit includes an air diaphragm sensor 3 (FIG. 2) adapted to sense the level of hydrofluoric acid in the self-lubricating plastic container 1', an air regulator 4 (FIG. 2) adapted to regulate the pressure of N2 such that it meets the specification of the air diaphragm sensor 3, and a needle valve 5 (FIG. 2) adapted to regulate the flow rate of N2.

The hydrofluoric acid dispensing unit includes the double self-lubricating plastic container 1' having a dispensing container 1'a and an outer container 1'b, a self-lubricating plastic conduit 6' and an automatic valve 7' which are adapted to drain a predetermined quantity of the hydrofluoric acid from the dispensing container 1'a, a self-lubricating plastic conduit 8' and an automatic valve 9' which are adapted to feed the hydrofluoric acid from the outer container 1'b to the mixing tank 17', and an air filter 10 (FIG. 2).

On the other hand, the automatic hydrofluoric acid supply unit includes the hydrofluoric acid tank 2' containing the hydrofluoric acid supplied from the outer container 1'b of hydrofluoric acid dispensing unit, a self-lubricating plastic conduit 11' connected to the self-lubricating plastic conduit 8' of tihe hydrofluoric acid dispensing unit and an automatic valve 12' disposed in the self-lubricating plastic conduit I I ', a bellows pump 13' adapted to pump the hydrofluoric acid from the hydrofluoric acid tank 2' to the self-lubricating plastic container 1', a self-lubricating plastic conduit 14' and an automatic valve 15' which are adapted to the hydrofluoric acid from the hydrofluoric acid tank 2 to the self-lubricating plastic container 1', and an empty sensor 16' adapted to sense no hydrofluoric acid in the chemical tank 2.

The mixing unit includes an electronic balance 20 of 30 Kg±2.5 g which can measure precisely the weight of the mixed liquid, an indicator 21 adapted to indicate numerically the weight measured by the balance 20, the mixing tank 17' adapted to mix the deionized water and the hydrofluoric acid, deionized water supply control valves 22 and 23 which are adapted to supply the aleionized water to the mixing tank 17a' in large and small quantities, respectively, a control valve 24 adapted to control the flow of the mixed liquid which is pumped from the mixing tank 17' to the storage tank, and a N2 bubbling unit 17a' adapted to uniformly mix the deionized water and the hydrofluoric acid.

The mixed liquid draining unit includes a drain pump 25 adapted to pump the mixed liquid from the mixing tank 17' to the storage tank and a chemical filter 26 for separating particles from the mixed liquid.

On the other hand, the control unit coreDrises a controller 27 containing a circuit substrate and electronic elements therein and having a switch panel. The control unit also has an error display function.

Operation of the mixing apparatus having the above-mentioned arrangement according to the present invention will now be described.

In order to sense the level of hydrofluoric acid, the air regulator 4 is first adjusted such that the N2 pressure across the air regulator 4 is 20 psi. On the other hand, other air pressures are adjusted to 4 to 5 Kg/cm$^2$. It is then checked that respective automatic valves 7', 9', 12', 15', 22, 23 and 24 which are of a normal close type are maintained at their closed states. The initial value of the electronic balance 20 is also checked.

Then, the mixing apparatus is powered on so as to check whether the empty sensor 16' of the 5 gallon hydrofluoric acid tank 2' is at its OFF state. If the empty sensor 16' is at its ON state, that is at no hydrofluoric acid state, the empty hydrofluoric acid tank 2' is substituted with a new one. Under the above-mentioned condition, automatic valves 12' and 15' of the automatic hydrofluoric acid supply unit are opened. The bellows pump 13' also operates to supply the hydrofluoric acid. from the hydrofluoric acid tank 2' to the self-lubricating plastic container 1' via the self-lubricating plastic conduit 14' so that the hydrofluoric acid is maintained at the level A of the self-lubricating plastic container 1'.

As the hydrofluoric acid is supplied to the level A of the teflon container 1, the hydrofluoric acid level sensing unit closes automatic valves 12' and 15'. Also, the bellows pump 13' is stopped by the hydrofluoric acid level sensing unit.

Thereafter, the automatic valve 9' of the hydrofluoric acid dispensing unit is opened so that the hydrofluoric acid in the outer container 1'b is drained to be maintained at the level C. As a result, the hydrofluoric acid in the dispensing container 1'a is maintained at the level B which corresponds to 100 cc.

Since the hydrofluoric acid dispensing container 1'a has at its peripheral edge a plurality of spaced recesses 1'c so as to avoid any possible surface tension at the upper peripheral edge of the container 1a, a precise 100 cc of the hydrofluoric acid is contained and maintained in the dispensing container 1a.

When the precise 100 cc of hydrofluoric acid is contained in the dispensing container 1'a, the automatic valve 7' of the hydrofluoric acid dispensing unit is opened to supply the hydrofluoric acid from the dispensing container 1'a to the mixing tank 17' laid on the electronic balance 20'. After the completion of discharging the hydrofluoric acid, the valve 7' is closed.

Then, the supply control valve 22 is opened, so that 9.9 l of deionized water which quantity approxlmates to 100 times as large as 100 cc enters the mixing tank 17'.

At this time, the quantity of deionized water can be adjusted by the indicator 21 of the electronic balance 20.

Under the condition that the deionized water is supplied to the mixing tank 17' in the quantity of less than 10 l, but closety approximating thereto, the supply control valve 22 is closed. Then, the supply control valve 23 for controlling the supply of a small quantity of hydrofluoric acid is opened so that the deionized water additionally supplied to mixing tank 17' to fill the precise 10 l. The precise quantity of supplied deionized water is indicated and controlled by the indicator 21. After the completion of supplying the precise quantity of deionized water, a conventional N2 bubbling is performed which uses diatomic nitrogen gas bubbles to provide the agitating action so as to mix uniformly the aleionized water and the hydrofluoric acid.

Thereafter, the valve 24 is opened in response to the signal from a sensor, which indicates that the storage tank is empty. Simultaneously, the drain pump 25 operates to pump the mixed liquid from the mixing tank 17' to the storage tank. During the pumping operation of the drain pump 25, particles are separated from the pumped liquid, by the chemical filter 26. This pumping operation is continuously repeated until a liquid reaches the reference level in the storage tank.

in the above description, the present invention is described in conjunction with the example in which the deionized water and the hydrofluoric acid are mixed in the ratio of 100:1. However, the present invention is unlimited to the example and can be applied to any devices which are adapted to mix a large quantity of one liquid and a small quantity of the other liquid in a certain rate.

As apparent from the above description, the present invention provides a mixing apparatus comprising a self-lubricating plastic container of a double construction which enables to obtain a more precise quantity of liquid. According to the present invention, it is also possible to obtain a mixture of a large quantity liquid or a small quantity liquid in a precise mixing ratio with a tolerance of within 1%.

As the deionized water and the hydrofluoric acid can be mixed in the ratio of 100:1 according to the described example of the present invention, poor etching of wafers can be avoided.

Although the preferred embodiments of the invention have been disclosed for illustrative purpose, those skilled in the art will appreciate that various modifications, additions and substitutions are possible, without departing from the scope and spirit of the invention as disclosed in the accompanying claims.

What is claimed is:

1. A liquid dispenser comprising:
   a self-lubricating plastic container;
   liquid level sensing means for sensing levels of a liquid supplied in said container;
   liquid dispensing means for dispensing the liquid from said container in a quantity corresponding to a capacity of said container; and
   automatic liquid supply means for automatically supplying the liquid from a chemical tank to said container.

2. A liquid dispenser in accordance with claim 1, wherein said liquid level sensing means comprises:
   a gas diaphragm sensor adapted to sense a level of liquid in the container;
   a gas regulator responsive to said gas diaphragm sensor for regulating the pressure of a gas; and
   a needle valve adapted to regulate the flow rate of said gas.

3. A liquid dispenser in accordance with claim 1, wherein said liquid dispensing means comprises:
   said container having a dispensing container and an outer container, a self-lubricating plastic conduit and an automatic valve which are adapted to drain a predetermined quantity of the liquid from said dispensing container, and another self-lubricating plastic conduit and automatic valve which are adapted to feed the liquid from said outer container to the chemical tank.

4. A liquid dispenser in accordance with claim 3, wherein said automatic liquid supply means comprises said chemical tank storing liquid therein, self-lubricating plastic conduit connected to the conduit of the liquid dispensing means which is adapted to feed the liquid from the outer container to the chemical tank, an automatic valve disposed in said last mentioned conduit, a bellows pump adapted to pump the liquid from the chemical tank to the container, another self-lubricating plastic conduit and automatic valve which are adapted to guide the liquid from the chemical tank to the container, and an empty sensor that indicates the absence of liquid in the chemical tank.

5. A liquid dispenser in accordance with claim 3, wherein said dispensing container has an upper peripheral edge on which a plurality of spaced recesses are located so that a precise quantity of the liquid is contained in said dispensing container.

6. An apparatus for mixing two liquids in a predetermined mixing ratio, comprising:
   a liquid dispenser that includes
      (a) self-lubricating plastic container,
      (b) liquid level sensing means for sensing levels of a liquid supplied in said container,
      (c) liquid dispensing means for dispensing liquid from said container in a quantity corresponding to a capacity of said container, and (d) automatic liquid supply means for automatically supplying liquid from a chemical tank to said container;

mixing means for mixing precisely the liquids in the precise predetermined mixing ratio;

liquid mixture draining means for draining the liquid mixture from said mixing means; and control means for controlling said previously mentioned means.

7. An apparatus in accordance with claim 6, wherein said mixing means comprises an electronic balance adapted to measure precisely the weight of the liquid mixture, an indicator adapted to indicate numerically the weight measured by said balance, a mixing tank adapted to mix the liquids, a pair of control valves which are adapted to supply the liquids in large and small quantities, respectively, another control valve adapted to control the flow of the liquid mixture fed from said mixing tank, and a N2 gas bubbling unit adapted to uniformly mix the liquids.

8. An apparatus in accordance with claim 6, wherein said liquid mixture draining means comprises a drain pump adapted to pump the liquid mixture from the mixing tank and a chemical filter for separating particles from the liquid mixture.

9. An apparatus in accordance with claim 6, wherein said control means comprises a controller containing a circuit substrate, electronic elements and a switch panel and having an error display function.

10. An apparatus for mixing a combination of liquid chemicals in a predetermined ratio, including a first liquid dispenser for dispensing a predetermined amount of a first liquid;

a second liquid dispenser for dispensing a predetermined amount of a second liquid; and mixing means for mixing said first and second liquids;

wherein said first liquid dispenser comprises an outer container;

a dispensing container located within said outer container, an upper edge of said dispensing container being formed with a plurality of spaced recesses;

supply means for supplying said first liquid to both said outer container and said dispensing container;

liquid sensor means for determining whether said first liquid in said first liquid dispenser is at a first, second or third predetermined level;

first delivery means for delivering said first liquid contained within said dispensing container to said mixing means; and second delivery means for delivering said first liquid contained within said outer container back to said supply means;

wherein said supply means provides said first liquid until said first level is attained;

said second delivery means drains said first liquid until said second level is reached, such that said first liquid contained with in said dispensing container is at said third level;

said first delivery means drains an amount of liquid from said dispensing container corresponding to said third level, and delivers said amount to said mixing means.

* * * * *